United States Patent [19]
Van De Sompele

[11] 4,241,813
[45] Dec. 30, 1980

[54] BAND BRAKE PARKING LEVER

[75] Inventor: Norman C. Van De Sompele, South Bend, Ind.

[73] Assignee: The Bendix Corporation, Southfield, Mich.

[21] Appl. No.: 53,602

[22] Filed: Jun. 29, 1979

[51] Int. Cl.³ .............. F16D 49/08; F16D 49/10; F16D 49/12
[52] U.S. Cl. .............. 188/77 R; 188/106 F; 192/80; 192/83; 192/99 B
[58] Field of Search .......... 188/77 R, 106 F, 106 R, 188/75; 192/80, 83, 99 B

[56] References Cited

U.S. PATENT DOCUMENTS

| | | | |
|---|---|---|---|
| 1,464,761 | 8/1923 | Hardin | 188/77 R |
| 3,036,668 | 5/1962 | Falk et al. | 188/77 R |
| 3,220,514 | 11/1965 | Erickson | 188/77 R |
| 3,386,534 | 6/1968 | Press | 188/106 F X |

FOREIGN PATENT DOCUMENTS 1030201  5/1958  Fed. Rep. of Germany ........ 188/77 R
766500  4/1934  France ..................... 188/77 R

OTHER PUBLICATIONS

Ball Ramp Brake, Clark Equipment, LT8170, sheet 2, Aug. 24, 1978.

*Primary Examiner*—George E. A. Halvosa
*Attorney, Agent, or Firm*—Paul David Schoenle; Ken C. Decker

[57] ABSTRACT

A band brake assembly includes a housing which carries a rotatable member and a band with a friction lining substantially surrounding the rotatable member. A parking brake lever is connected to a parking brake actuator and also to a plurality of links which are connected to respective ends of the band. The parking brake lever engages the housing and pivots relative to the housing to move the links and separate the band ends and contract the band in response to the movement of the parking brake actuator. A pivotal connection joins the links to each other and to the parking brake lever.

3 Claims, 4 Drawing Figures

BAND BRAKE PARKING LEVER

BACKGROUND OF THE INVENTION

This application relates to a parking brake lever in a band brake assembly.

A typical band brake assembly includes a plurality of links attached to ends of a band which carries a friction lining which contracts into frictional engagement with a rotatable member when the links are acted upon by an actuator. In one band brake assembly each link includes a portion which engages a separate actuator and the links pivotally engage a surface of the assembly housing. In another band brake assembly one actuator engages a pivotal connection between the links and another actuator engages a portion of one of the links and the links pivotally engage the band.

SUMMARY OF THE INVENTION

It is an object of this invention to provide a one-piece band brake parking lever which applies the brake independently of the service brake actuator when a parking brake actuator rod is moved toward the rotatable member.

It is an object of this invention to provide a parking brake lever which has a mechanical advantage effect on the input to the band over the input to the parking brake actuator.

It is an object of this invention to provide a parking brake lever which is separate from either of the links which are connected to the ends of the band and which cooperates with a fulcrum formed out of a surface of the band brake housing.

In accordance with these objects, a band brake assembly is provided with a parking lever having one arm terminating in a curved rocker portion which pivots on a fulcrum surface formed by the band brake housing. A second lever arm is connected to a roller which engages a parking brake actuator rod. The lever may be pivotally connected between the arms, to another roller and to links which are attached to the band ends. The lever pivots about the fulcrum to move the links to separate the band to contract the band into frictional engagement with a rotatable member.

DETAILED DESCRIPTION

Figure 1:
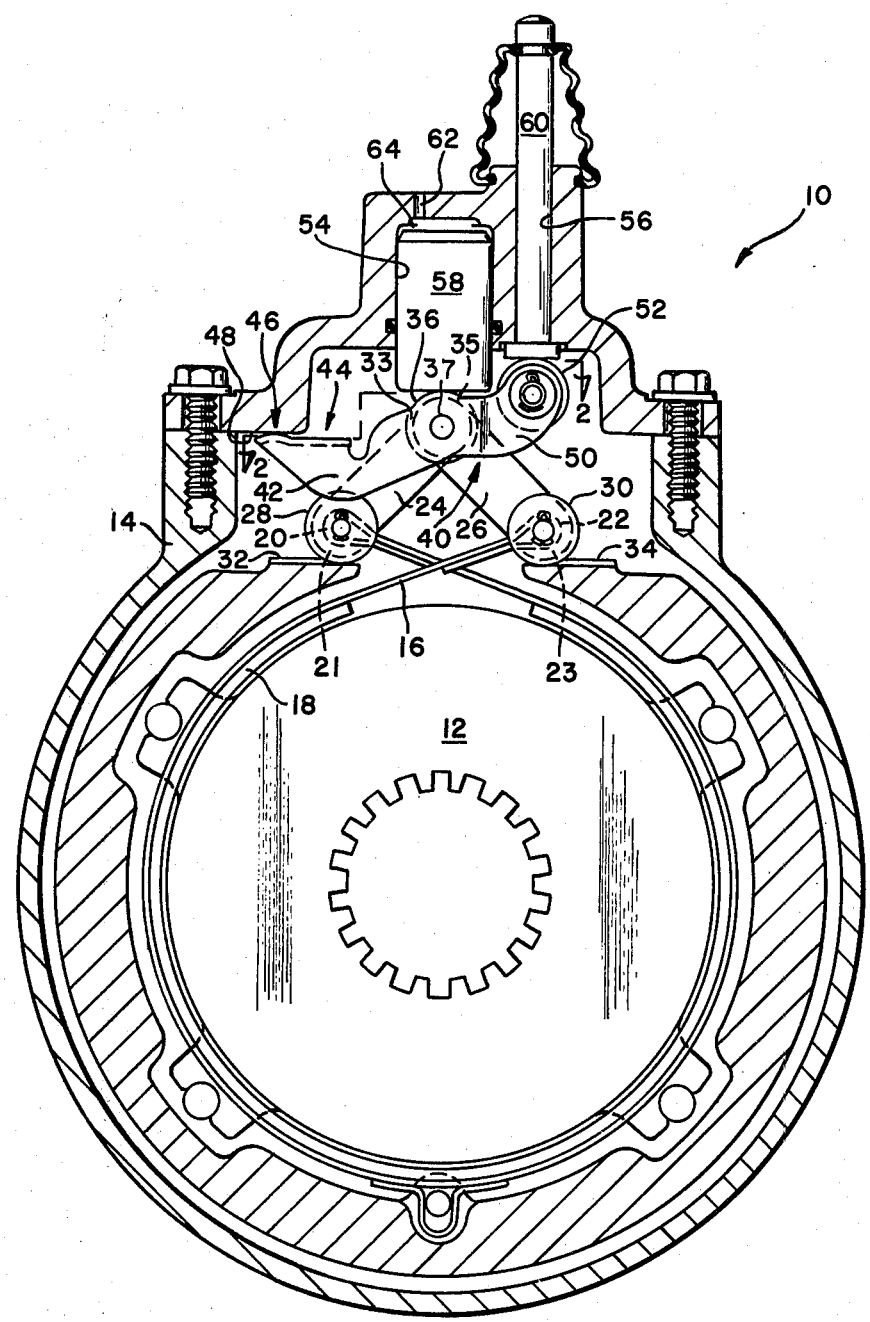
FIG. 1 shows a band brake assembly including a parking brake lever as disclosed herein.
Figure 2:
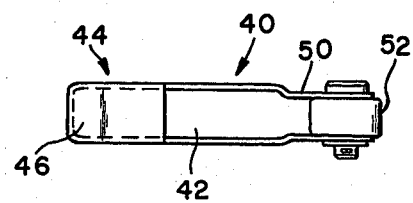
FIG. 2 shows the parking brake lever viewing in the direction of arrows 2—2 of FIG. 1.

A band brake assembly 10, includes a rotatable member 12 carried in a housing 14. A band 16 carries a friction lining 18 which substantially surrounds the rotatable member 12. The band 16 includes a crossed pair of looped end portions 20 and 22 which are connected to ends 21 and 23 of corresponding one piece or unitary links 24 and 26. Rollers 28 and 30 are also connected to the band ends 20 and 22 and these rollers engage housing surfaces 32 and 34. The other ends 33 and 35 of links 24 and 26 are pivotally connected to each other and to roller 36 at 37.

A one-piece parking brake lever 40 is also pivotally connected at 37 to the links 24 and 26 and roller 36. One arm 42 of the lever 40 terminates at one end in a rocker surface 44 with an arcuate portion 46 which engages a flat housing surface 48 which acts as a fulcrum about which lever 40 pivots. The other arm 50 of lever 40 is connected to parking brake roller 52 at the opposite end. Lever 40 is pivotally connected to roller 36 and to links 24 and 26 at 37 between lever arms 42 and 50 and between roller 52 and housing fulcrum surface 48.

The housing includes a pair of bores 54 and 56. Hydraulic service brake actuator piston 58 is disposed within bore 54 and engages roller 36. A parking brake actuator rod 60 extends through bore 56 and is connected to parking lever 40 via its engagement with parking brake roller 52. Passage 62 communicates chamber 64 in bore 54 with a source of hydraulic fluid pressure (not shown).

Figure 3:
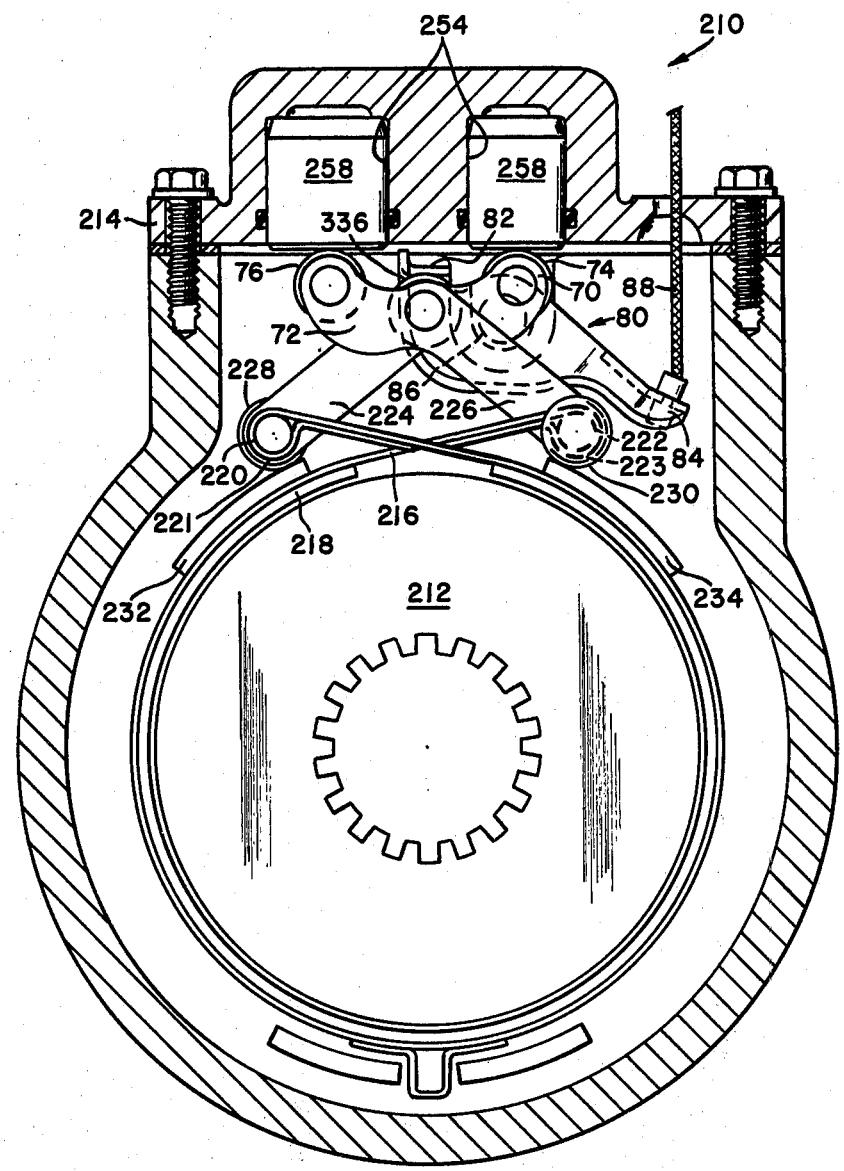
FIG. 3 shows a band brake assembly with an alternative embodiment of applicant's parking lever.
Figure 4:
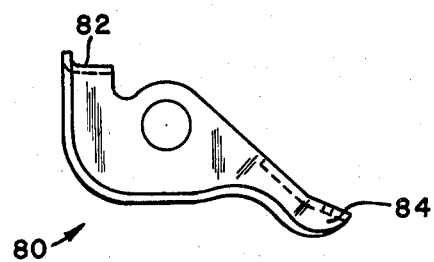
FIG. 4 shows applicant's alternative parking lever isolated from the remainder of the band brake assembly.

An alternate embodiment of applicant's parking brake lever is illustrated in FIGS. 3 and 4. FIG. 3 uses reference numerals obtained by adding 200 to the FIG. 1 reference numerals for similar elements. In FIG. 3, the links 224 and 226 include portions 70 and 72, respectively, which extend from the common connection of links 224 and 226 with roller 336. Rollers 74 and 76 are attached to the ends of portions 70 and 72. This embodiment includes a pair of service brake actuators, both indicated by reference numeral 258 for engaging rollers 74 and 76.

One-piece parking brake lever 80 includes an abutment portion 82 at one end thereof and an actuator attachment portion 84 at the opposite end thereof. Lever 80 pivots about a fulcrum defined by portion 86 of housing 214. Cable 88 connects lever 80 to an operator parking brake control (not shown). Abutment portion 82 is adapted to engage roller 336 to actuate the brake.

MODE OF OPERATION

Upon a service brake application, hydraulic fluid is introduced into chamber 64 via passage 62 to force piston 58 toward the rotatable member 12. This movement of piston 58 causes roller 36 and the connected ends of links 24 and 26 to also move toward rotatable member 12. Since rollers 28 and 30 are constrained to move along flats 32 and 34, this movement also causes the other ends of links 24 and 26 and thus band ends 20 and 22 to separate. As band ends 20 and 22 separate, the band 16 and the friction lining 18 move into braking engagement with the rotatable member 12.

Upon a parking brake application the rod 60 within bore 56 moves towards the rotatable member 12 in response to an input force. The rod 60 engages the roller 52 which is connected to the arm 50 of parking brake lever 40 and causes the lever 40 to pivot in a clockwise manner with lever arcuate portion 46 pivoting on the housing fulcrum surface 48. As the lever 40 pivots it causes roller 36 to move toward the rotatable member 12 to separate band ends 20 and 22 and thus move the band 16 and friction lining 18 into braking engagement with the rotatable member 12.

The operation of the parking brake lever 40 is independent of the operation of the service brake actuator piston 58 and the force on the links 24 and 26 has a mechanical advantage over the input force applied to the rod 60 during a parking brake application.

With respect to the parking brake lever illustrated in FIGS. 3 and 4, service brake actuation is obtained by the introduction of pressurized brake fluid into either of bores 254 to force either of pistons 258 towards the rotatable member 212. This causes links 224 and 226 to pivot about their common connection with roller 336 so that ends 221 and 223 separate, causing band 216 with friction lining 218 to contract into frictional engagement with rotatable member 212.

A parking brake application is made with lever 80 through the application of tension to cable 88. This causes lever 80 to pivot about fulcrum 86 in a counterclockwise manner, viewing FIG. 3, so that abutment member 82 engages and forces roller 336 downwards towards rotatable member 212. The downward motion of roller 336 forces link ends 221 and 223 to separate as rollers 228 and 230 roll along the surface of housing portions 232 and 234. The separation of band ends 221 and 223 contracts band 216 and friction lining 218 into frictional engagement with rotatable member 212.

I claim:

1. In a band brake assembly having a housing, a rotatable member carried by said housing, a band disposed within said housing and carrying a friction lining substantially surrounding said rotatable member, a pair of unitary links having a common pivotal connection therebetween, each link being connected with a respective end of said band, a hydraulic service brake actuator cooperating with said pair of links to contract said friction lining into engagement with said rotatable member to retard the rotation of said rotatable member, a parking brake actuator, and a unitary parking brake lever connected to said parking brake actuator, said parking brake lever including a first end pivotally engaging said housing and a second end remote from said first end connecting with said parking brake actuator and engaging said common pivotal connection and cooperating with said pair of links to contract said friction lining into engagement with said rotatable member upon a parking brake application, characterized by said unitary parking brake lever being engageable with said housing, the engagement of said lever with said housing defining a fulcrum about which said lever pivots in response to operation of said parking brake actuator.

2. The band brake assembly of claim 1, wherein: said pivotal connection also pivotally connects said pair of links with said parking brake lever.

3. The band brake assembly of claim 3, wherein: said pivotal connection is located between said first and second ends of said parking brake lever.

* * * * *